C. J. GUSTAFSON.
SIDE CAR ATTACHMENT FOR MOTOR CYCLES.
APPLICATION FILED FEB. 13, 1913.

1,267,212.

Patented May 21, 1918.
2 SHEETS—SHEET 1.

Witnesses

Inventor
Carl J. Gustafson
By Sturtevant & Mason
Attorneys

UNITED STATES PATENT OFFICE.

CARL J. GUSTAFSON, OF SPRINGFIELD, MASSACHUSETTS, ASSIGNOR, BY MESNE ASSIGNMENTS, TO HENDEE MANUFACTURING COMPANY, OF SPRINGFIELD, MASSACHUSETTS, A CORPORATION OF MASSACHUSETTS.

SIDE-CAR ATTACHMENT FOR MOTOR-CYCLES.

1,267,212. Specification of Letters Patent. Patented May 21, 1918.

Application filed February 13, 1913. Serial No. 748,172.

*To all whom it may concern:*

Be it known that I, CARL J. GUSTAFSON, a subject of the King of Sweden, residing at Springfield, in the county of Hampden, State of Massachusetts, have invented certain new and useful Improvements in Side-Car Attachments for Motor-Cycles, of which the following is a description, reference being had to the accompanying drawing and to the figures of reference marked thereon.

The invention relates to side-car attachments for motorcycles.

The object of the invention is to provide a side-car attachment adapted primarily to the spring frame shown in application of Hedstrom & Gustafson, Serial No. 697,926, filed May 17, 1912, patented June 23, 1914, No. 1,101,435, and to so connect the side car to the motorcycle frame that the shocks will be borne and absorbed by the springs of said frame, thus relieving the side car therefrom, and affording ease and comfort to the occupant thereof.

This object is accomplished by the construction shown in the accompanying drawings, in which,—

Figure 1:
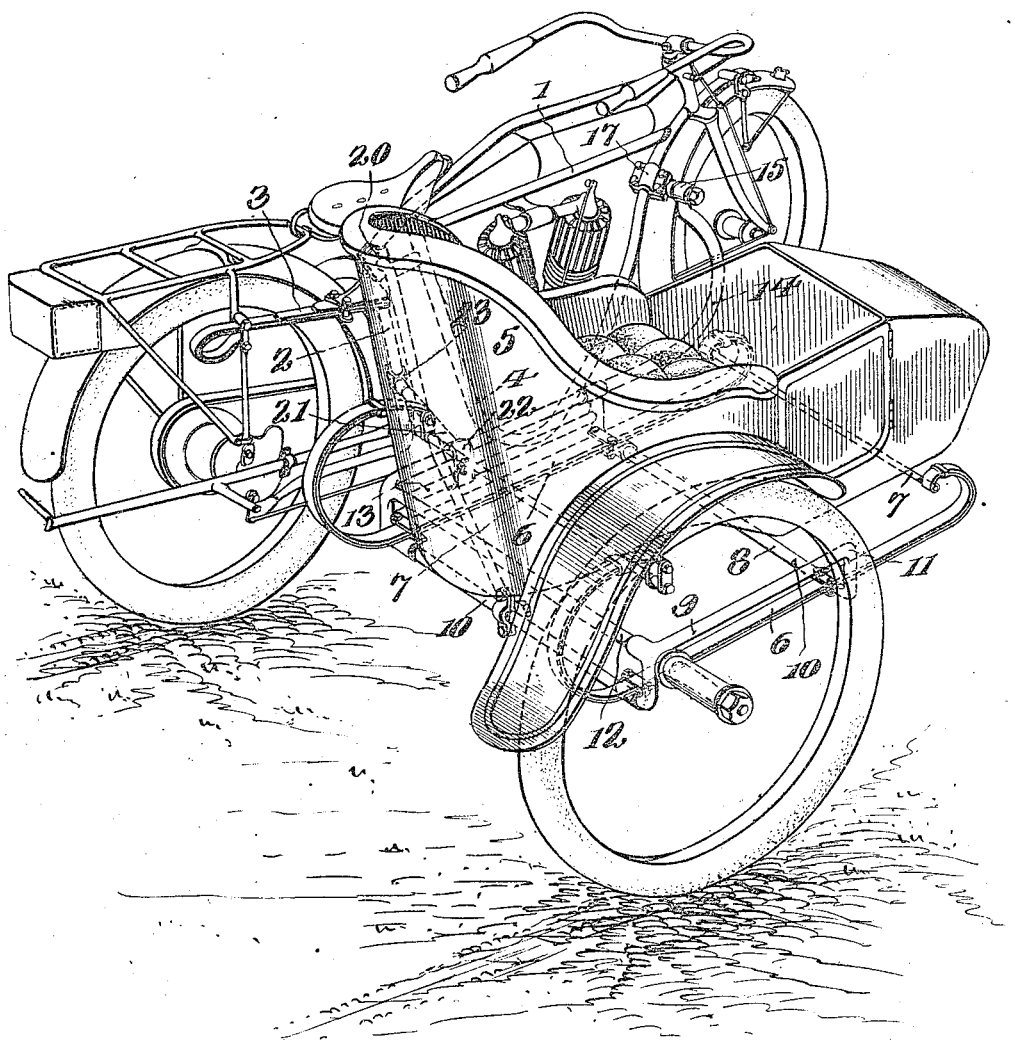
Figure 2:
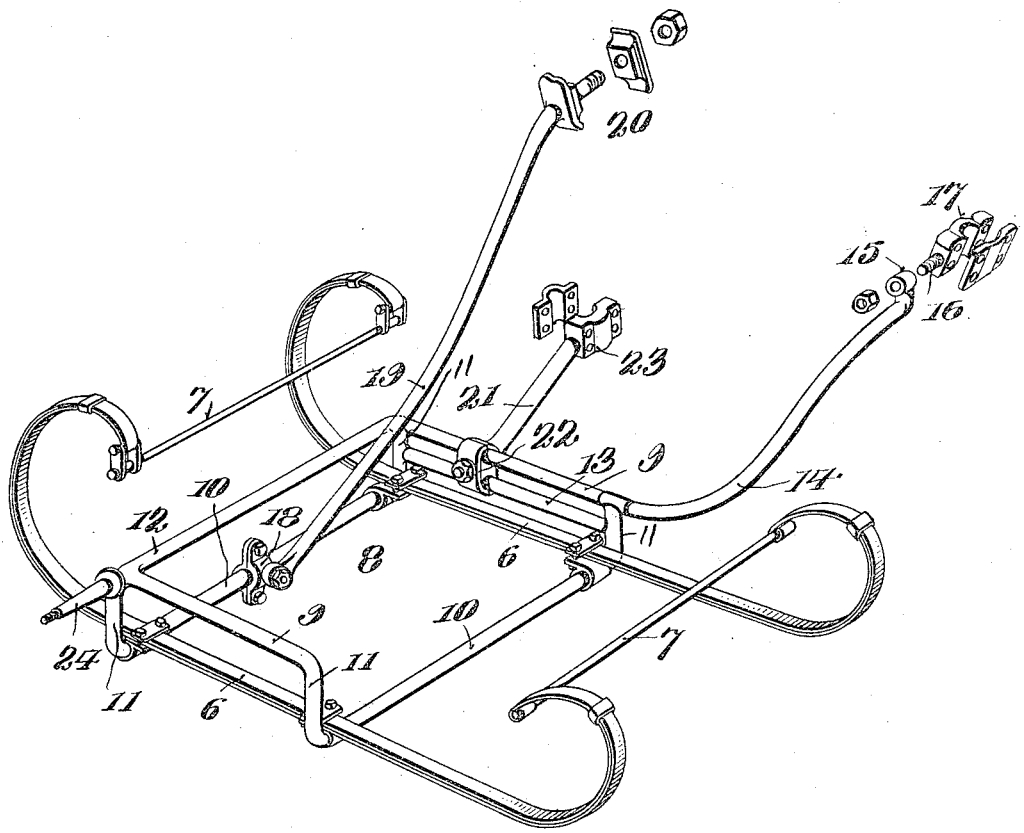

Figure 1 is a rear perspective of my side car, attached to the motorcycle frame of the application referred to, Fig. 2 is a front perspective of the frame of the side car detached.

1 designates the motorcycle frame referred to; 2 designates the upright bar just behind the seat and adjacent to the inner ends of the rear springs 3; and 4 designates the drop-bar; these bars 2, 3 and 4, forming elements of the rigid part of the frame to which the front and rear wheels are connected by the supporting springs.

Referring now to the side car attachment, 5 designates the body of the car and which may be of any approved design and construction. The body 5 is supported at its front and rear by the longitudinal side springs 6, curved upwardly and inwardly at their ends, and there pivotally connected to the transverse bars, bolts or arms 7, projecting beyond the sides of the body. These springs 6, 6, rest upon a rigid frame 8, formed of the longitudinal bars 9, 9, front and rear cross bars 10, 10, connected to bars 9, 9, by downward bends or offsets 11, 11, and a second rear cross bar 12 connecting bars 9, 9, above the rear cross bar 10, the whole forming a rigid body-supporting and attaching frame.

At the inner side of this frame 8 is a second longitudinal bar 13, parallel with the bar 9, and lying directly thereunder. The upper inner longitudinal bar 9 is extended forwardly, upwardly and laterally, as at 14, and terminates in an eye 15 receiving the bolt 16, carried by a clip 17, bolted to the upper forward portion of the drop bar 4 of the motorcycle frame.

To the rear lower cross bar 10 of the frame 8 is attached by a clip 18 or otherwise, the lower offset end of a vertically disposed attaching bar 19, the upper end of which is connected by a clip 20, or otherwise, to the upper end of the rear upright 2 of the motorcycle frame.

A third connection between the frames 8 and 1 is made by the bar 21, having at its inner end the clamping device 22, adjustable along the two inner bars 9 and 13, and at its other end detachably connected by a clamp 23 to the lower portion of the upright 2 of the motorcycle frame.

From the rear outer corner of the frame 8 projects a wheel spindle 24, upon which is mounted the wheel 21.

From the foregoing, it will be seen that the seat attachment may be readily applied to and detached from a motorcycle, and owing to its points of attachment to the latter, all of the shocks due to the latter's frame will be absorbed by the wheel-supporting springs, and not be transferred to the seat frame.

The clamping device 22 adjustable along the bars 9, 13, not only allows of the easy removal of the side car, but also gives an adjustability forward and back on any frame.

Having thus described the invention, what is claimed as new is:—

1. A side car attachment for motorcycles comprising, a rectangular body-supporting frame, a bar extending forwardly, upwardly and laterally from the forward end of the inner side of the frame and provided with an attaching clip at its upper end to engage the upper forward portion of a motorcycle drop bar, a second bar having a longitudinally adjustable connection with its rear frame bar and having a clip for connection with the upper rear portion of a motorcycle frame, and a third shorter bar adjustable longitudinally at the lower end along the inner side of the body-supporting frame and having a clip at the upper outer end for connection with a rear vertical bar of a motorcycle frame.

2. A side car attachment comprising, a rectangular body-supporting frame, a bar extending upwardly, forwardly laterally from the forward end of the inner side of said frame, and provided at its upper end with a pivoted attaching clip, a clip adjustable along the rear frame bar, an attaching bar pivoted at the lower end to said clip and extending upwardly and outwardly beyond the inner side of the frame and provided with an attaching clip at the upper end, and a shorter third bar having a clip at its lower end adjustable along the inner side of the frame and provided at its upper end with an attaching clip.

3. A side-car attachment for motorcycles, comprising a body-supporting frame having a single front and two rear cross bars, a single outer and two parallel inner longitudinal side bars, longitudinal car or seat supporting side springs mounted on the front and rear lower cross bars, and curved upwardly at their ends for connection with a car or seat, a wheel at the outer rear part of said frame, an attaching bar extending upwardly and laterally from one of the rear cross bars, an adjustable attaching clamping device between the two parallel inner side bars, a laterally extending bar projecting therefrom, and a forward attaching bar forming an extension of the inner upper side bar and extending upwardly and inwardly for connection with the upper forward end of the motorcycle drop bar.

In testimony whereof I affix my signature in the presence of two witnesses.

CARL J. GUSTAFSON.

Witnesses:
CARL O. HEDSTROM,
H. E. MADDEN.

Copies of this patent may be obtained for five cents each, by addressing the "Commissioner of Patents, Washington, D. C."